Patented May 30, 1950

2,509,454

UNITED STATES PATENT OFFICE 2,509,454

SALTS OF BENZOTHIAZYL SULFINIC ACIDS

William F. Russell, Norwalk, Conn., assignor to R. T. Vanderbilt Company, Inc., New York, N. Y., a corporation of New York No Drawing. Application September 5, 1947, Serial No. 772,467

2 Claims. (Cl. 260—306)

In my application filed April 2, 1947, Serial No. 738,913, I described a new method for making thiazoles, particularly benzothiazole. Essentially, that method comprised the oxidation with hydrogen peroxide of the sodium salt of 2-mercaptobenzothiazole, for example, in aqueous solution, the molar ratio of hydrogen peroxide: sodium salt being 2:1. On prolonged standing benzothiazole will separate from the reaction mixture. In the preferred embodiment of that method, the benzothiazole is liberated by the addition of sulfuric acid in the molar ratio sulfuric acid: sodium salt of 2-mercaptobenzothiazole of 1:2. In that application I suggested that the reaction might proceed in two steps, first the formation of the sodium salt of benzothiazyl sulfinic acid and second the decomposition of this compound with the formation of sulfur dioxide and the liberation of benzothiazole.

I have now discovered that an intermediate compound is formed in carrying out that method and that it can be isolated by evaporation of the primary reaction mixture prior to acidification in approximately the theoretical yield. The new compound derived from 2-mercaptobenzothiazole is the sodium sulfinate of benzothiazole. It is illustrated by the following type formula:

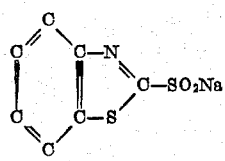

The salt is a pale, greenish-white. It can be oven-dried and pulverized and is stable when stored in glass. It is decomposed rapidly by mineral acids with formation of sulfur dioxide and liberation of benzothiazole. It dissolves readily in water. The aqueous solution of the salt reacts, for example, with copper sulfate, lead acetate, silver nitrate and mercuric chloride to form insoluble salts of copper, lead, silver and mercury, respectively. This new compound, the sodium sulfinate of benzothiazole, is useful as a low cost intermediate in the production of pharmaceuticals and dyestuffs. It will react with alkyl halides to yield sulfones. It is oxidized by hypochlorites to yield a sulfonic acid which is conveniently recovered as the ammonium salt.

The following specific example will illustrate my invention: 227 grams of the sodium salt of 2-mercaptobenzothiazole are dissolved in 977 cubic centimeters of water. This solution may be formed by dissolving 2-mercaptobenzothiazole in an aqueous solution of sodium hydroxide. The aqueous solution of the sodium salt of 2-mercaptobenzothiazole is charged into a 3 liter glass beaker partially immersed in cooling water. 292 grams of aqueous hydrogen peroxide, 30% $H_2O_2$, diluted with 200 cubic centimeters of water are run into the solution in the beaker, with continuous stirring, over a period of 75 minutes, while maintaining the temperature of the reaction mixture between 35° and 40° C. The reaction mixture, after standing for 15 minutes, is filtered to separate any solids and is then evaporated in an open dish on a water bath with an air jet. About 250 grams of the dry salt, sodium sulfinate of benzothiazole, is recovered.

The substituted 2-mercaptobenzothiazoles similarly yield the salts of the corresponding substituted benzothiazyl sulfinic acids. For example, from 5-chloro-2-mercaptobenzothiazole I derive the sodium salt of 5-chlorobenzothiazyl sulfinic acid. In like manner, the mercapto thiazoles generally yield the salts of the corresponding thiazyl sulfinic acids. For example, from 2-mercapto-4-phenylthiazole I derive the sodium salt of 4-phenylthiazyl sulfinic acid and from 2-mercapto, 4,5-dimethylthiazole I derive the sodium salt of 4,5-dimethylthiazyl sulfinic acid.

In identifying benzothiazoles, I number the substituent positions as follows:

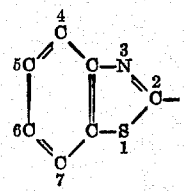

In identifying other thiazoles, I number the substituent positions as follows:

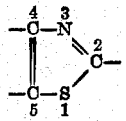

I claim:
1. The sodium salt of benzothiazyl sulfinic acid.
2. The sodium salts of the benzothiazyl sulfinic acids.

WILLIAM F. RUSSELL.

REFERENCES CITED

The following references are of record in the file of this patent:

UNITED STATES PATENTS

| Number | Name | Date |
|---|---|---|
| 2,179,984 | Spiegelberg | Nov. 14, 1939 |